(12) United States Patent
Harris et al.

(10) Patent No.: US 9,683,362 B2
(45) Date of Patent: Jun. 20, 2017

(54) HEAT RESISTANCE USING TITANIUM DIOXIDE NANOFIBERS

(71) Applicant: The Boeing Company, Chicago, IL (US)

(72) Inventors: John N. Harris, Seattle, WA (US); Daniel B. Slaton, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 945 days.

(21) Appl. No.: 13/913,641

(22) Filed: Jun. 10, 2013

(65) Prior Publication Data

US 2013/0295809 A1 Nov. 7, 2013

Related U.S. Application Data

(62) Division of application No. 12/272,638, filed on Nov. 17, 2008, now Pat. No. 8,916,082.

(51) Int. Cl.
| | |
|---|---|
| *B32B 5/16* | (2006.01) |
| *E04B 1/76* | (2006.01) |
| *C08K 7/08* | (2006.01) |
| *D21H 13/46* | (2006.01) |
| *D21H 17/20* | (2006.01) |

(52) U.S. Cl.
CPC .............. *E04B 1/7662* (2013.01); *C08K 7/08* (2013.01); *D21H 13/46* (2013.01); *D21H 17/20* (2013.01); *Y02T 50/43* (2013.01); *Y02T 50/433* (2013.01); *Y10T 428/237* (2015.01); *Y10T 428/238* (2015.01); *Y10T 428/24124* (2015.01); *Y10T 442/20* (2015.04); *Y10T 442/2631* (2015.04); *Y10T 442/668* (2015.04); *Y10T 442/696* (2015.04)

(58) Field of Classification Search
CPC .................................. B32B 5/16; B29C 51/12
USPC .................................................. 442/178, 180
See application file for complete search history.

(56) References Cited

U.S. PATENT DOCUMENTS

| | | | |
|---|---|---|---|
| 3,778,334 A | * | 12/1973 | Sturgeon .................. G21D 5/02 428/116 |
| 4,567,076 A | | 1/1986 | Therrien |
| 4,822,679 A | | 4/1989 | Cerdan-Diaz et al. |
| 4,847,140 A | | 7/1989 | Jaskowski |
| 5,624,726 A | | 4/1997 | Sanocki et al. |
| 7,137,596 B2 | | 11/2006 | Garrigus et al. |
| 7,521,394 B2 | | 4/2009 | Xie et al. |
| 7,767,597 B2 | | 8/2010 | Garvey |
| 2005/0058805 A1 | | 3/2005 | Kimura et al. |

(Continued)

FOREIGN PATENT DOCUMENTS

| | | |
|---|---|---|
| CN | 102617958 A | 8/2012 |
| CN | 102633952 A | 8/2012 |

(Continued)

OTHER PUBLICATIONS

Notice of Allowance, dated May 19, 2014, regarding U.S. Appl. No. 12/272,638, 16 pages.
International Search Report and Written Opinion, dated Dec. 7, 2009, regarding Application No. PCT/US2009/060241 (WO2010056447), 13 pages.

(Continued)

*Primary Examiner* — Peter Y Choi
(74) *Attorney, Agent, or Firm* — Yee & Associates, P.C.

(57) ABSTRACT

A composite structure includes a resin and a plurality of titanium dioxide fibers provided in the resin.

18 Claims, 3 Drawing Sheets

(56) References Cited

U.S. PATENT DOCUMENTS

| | | | |
|---|---|---|---|
| 2006/0060690 A1* | 3/2006 | Aisenbrey | B64C 1/12 244/1 R |
| 2007/0202334 A1 | 8/2007 | Xie et al. | |
| 2008/0166937 A1 | 7/2008 | Garvey | |
| 2008/0242178 A1 | 10/2008 | Reneker et al. | |
| 2010/0285264 A1 | 11/2010 | Harris et al. | |

FOREIGN PATENT DOCUMENTS

| | | |
|---|---|---|
| DE | 1900064 A1 | 8/1970 |
| EP | 1134479 A2 | 9/2001 |
| EP | 2236412 A2 | 10/2010 |
| JP | 04320443 A | 11/1992 |
| JP | 08073220 A | 3/1996 |
| JP | 2011241279 A | 12/2011 |
| NL | 7204429 A | 2/1972 |
| SU | 649670 A | 2/1979 |
| WO | WO9908969 A1 | 2/1999 |
| WO | WO2010056447 A1 | 5/2010 |

OTHER PUBLICATIONS

"Current ProofCo Projects," IP2Biz LLC, copyright 2007, 4 pages. Accessed Oct. 7, 2008, http://ip2biz.com/Offerings/ProofCoProjects.asp.

"Nonwoven Fabric," Complete Textile Glossary, copyright 2001, Celanese Acetate LLC, p. 106.

Office Action, dated May 19, 2011, regarding U.S. Appl. No. 12/272,638, 17 pages.

Final Office Action, dated Oct. 17, 2011, regarding U.S. Appl. No. 12/272,638, 17 pages.

Office Action, dated Jul. 6, 2012, regarding U.S. Appl. No. 12/272,638, 20 pages.

Final Office Action, dated Dec. 21, 2012, regarding U.S. Appl. No. 12/272,638, 18 pages.

UK Intellectual Property Office Combined Search and Examination Report, dated May 31, 2013, regarding Application No. GB1308808.3, 6 pages.

UK Intellectual Property Office Further Search Report, dated Aug. 13, 2013, regarding Application No. GB1308808.3, 3 pages.

* cited by examiner

HEAT RESISTANCE USING TITANIUM DIOXIDE NANOFIBERS

RELATED APPLICATIONS

This application is a divisional application of and claims priority to patent application Ser. No. 12/272,638, filed Nov. 17, 2008, status pending.

TECHNICAL FIELD

The disclosure relates to structures having a high heat resistance which are suitable for aerospace applications. More particularly, the disclosure relates to structures having titanium dioxide nanofibers which impart improved heat resistance to the structures and a method of fabricating the structures.

BACKGROUND

It may be desirable for insulation blankets which are used in the lower half of an aircraft fuselage to be more heat-resistant. The challenge for the aerospace industry is to develop new structures that exhibit the desired mechanical and heat-resistant properties without imposing a significant weight penalty. Therefore, insulation blanket cover films with improved heat resistance properties have been developed. Existing cover film structures which meet the new heat resistance requirements may be characterized as heavier than desired.

Accordingly, there is a need for insulation blankets that have improved mechanical and heat-resistant properties by incorporating a cover film that has improved heat resistance properties on the blankets that overcome the challenges discussed above.

SUMMARY

The disclosure is generally directed to improving heat resistance of various structures while maintaining light weight of the structures by incorporating titanium dioxide nanofibers into the structures. The disclosure is further generally directed to methods of fabricating structures having enhanced heat resistance.

In some illustrative embodiments, a composite structure 1 with enhanced heat resistance may include a resin 2 and a plurality of titanium dioxide fibers 3 provided in the resin 2.

In some illustrative embodiments, an insulation blanket batting 6 with enhanced heat resistance may include a blanket body 9 having a plurality of titanium dioxide fibers 3.

In some illustrative embodiments, an insulation blanket cover film 12 with enhanced heat resistance may include a cover film outer layer 13 and at least one layer of titanium dioxide fibers 3 provided on the cover film outer layer 13.

In some illustrative embodiments, a method of fabricating a structure with enhanced heat resistance 600 may include providing a plurality of titanium dioxide fibers 602; providing a resin 602b; impregnating the titanium dioxide fibers with the resin 606; and forming a composite structure by thermoforming the resin 608.

In some illustrative embodiments, a method of fabricating an insulation blanket with enhanced heat resistance 700 may include providing insulation blanket batting 702; providing an insulation blanket cover layer on the insulation blanket batting 704; providing a plurality of titanium dioxide fibers 706; and incorporating the plurality of titanium dioxide fibers in at least one of the insulation blanket batting and the insulation blanket cover layer 708.

In some illustrative embodiments, a method of fabricating a paper mat having enhanced heat resistance 800 may include providing a plurality of titanium dioxide fibers 802 and fabricating the plurality of titanium dioxide fibers into a paper mat 804.

In some illustrative embodiments, a composite structure 1 with enhanced heat resistance may include a resin 2 selected from the group consisting of phenolic, benzoxazine and bis-phenol cyanate ester and having a thickness of about 0.080 inch; a plurality of titanium dioxide fibers 3 having an average diameter of about 10 nanometers provided in the resin 2; and the plurality of titanium dioxide fibers 3 are doped with anions to enhance electrical conductivity of the plurality of titanium dioxide fibers 3.

In some illustrative embodiments, a method of fabricating a structure with enhanced heat resistance 600 may include providing a plurality of titanium dioxide fibers having an average diameter of about 10 nanometers 600; enhancing electrical conductivity of the plurality of titanium dioxide fibers by doping the plurality of titanium dioxide fibers with anions 602a; providing a resin selected from the group consisting of phenolic, benzoxazine and bis-phenol cyanate ester and having a thickness of about 0.080 inch 602b; impregnating the titanium dioxide fibers with the resin 606; forming a composite structure by thermoforming the resin 608; and fabricating the aircraft structure using the composite structure 610.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the embodiments of the disclosure which are defined by the claims. Furthermore, there is no intention to be bound by any expressed or implied theory presented in the preceding technical field, background, brief summary or the following detailed description.

Figure 1:
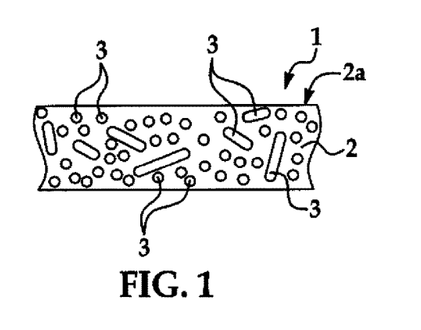
FIG. 1 is a cross-sectional view of an illustrative embodiment of a composite structure having titanium dioxide fibers.

Referring initially to FIG. 1, a composite structure 1 with enhanced heat resistance is shown. The composite structure 1 may be used in the fabrication of interior aircraft fuselage components such as sidewall panels, ceiling panels and/or cargo liners, for example and without limitation. The composite structure 1 may include a mat or paper 2a which is impregnated with a resin 2 which may be a low heat release resin, for example and without limitation. Resins which are suitable for the resin 2 may include, for example and without limitation, phenolics; benzoxazine and bis-phenol cyanate esters.

The mat or paper 2a may include a meshwork or weave of titanium dioxide ($TiO_2$) fibers 3 which extend throughout the resin 2. The titanium dioxide fibers 3 may be fabricated using a hydrothermal heating process and may be obtained from the IP2BIZ® LLC of Atlanta, Ga. Each of the titanium dioxide fibers 3 may have an average diameter of about 10 nanometers. In some applications, the titanium dioxide fibers 3 may be dyed titanium dioxide fibers. The dyed titanium dioxide fibers 3 may be necessary in some applications because the darkened fiber absorbs visible light more efficiently and may help to minimize light bleed-through. This type of structure property may be necessary in applications in which the titanium fibers 3 are to be incorporated into a light block used beneath a window reveal in an aircraft, for example and without limitation.

In some applications, the electrical conductivity of the titanium dioxide fibers 3 may be tailored by doping of the titanium dioxide with different anions of nitrogen, carbon and sulfer, for example and without limitation. Doping of the titanium dioxide with anions may significantly enhance conductivity of the titanium dioxide fibers 3. Enhancing the electrical conductivity of the titanium dioxide fibers 3 may be useful in applications in which the composite structure 1 is used in the fabrication of at least a portion of the outside portion of an aircraft fuselage, for example and without limitation. The FIGURES tend to show a high resin quality to make it easier to view the titanium dioxide fibers 3. The actual composite structure 1 may include a thin layer of resin 2 with the titanium dioxide fibers 3 incorporated therein.

The composite structure 1 may be fabricated by, for example and without limitation, randomly incorporating the titanium dioxide fibers 3 into random or non-random mat or paper form; pre-impregnating the mat or paper form with the resin 2; and thermally forming the resin into the composite structure 1 by, for example and without limitation, heating the resin 2 while forming or shaping the resin 2 and the paper mat 2a using a suitable tool or dye (not illustrated) in the conventional manner. The thickness 4 (FIG. 1) of the mat or paper form may generally correspond to the thickness of the component which will be fabricated using the composite structure 1. In some applications, the thickness of the mat or paper form may not exceed about 0.080 inches to impart the optimum thickness to the aircraft fuselage sidewall panel; ceiling panel; cargo liner; and/or other component which incorporates the composite structure 1.

The composite structure 1 may be used in the fabrication of any of a variety of interior aircraft fuselage components including but not limited to interior sidewall panels, ceiling panels and cargo liners. In some applications, the composite structure 1 may be used in the fabrication of the outer portion of an aircraft fuselage. Accordingly, the titanium dioxide fibers 3 in the composite structure 1 may impart improved heat resistance to the composite structure 1 without adding significant weight to the aircraft fuselage. Moreover, the titanium dioxide fibers 3 may improve electrical conductivity at the outer surface of the aircraft fuselage.

Figure 2:
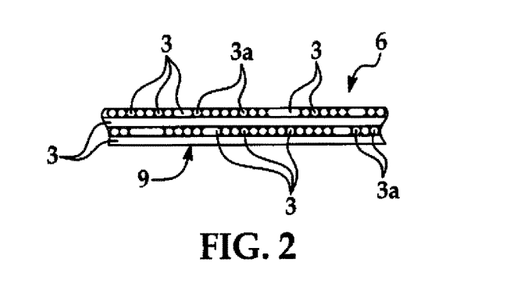
FIG. 2 is a cross-sectional view of an illustrative embodiment of an insulation blanket batting having titanium dioxide fibers.

Referring next to FIG. 2, an illustrative embodiment of an insulation blanket batting 6 with enhanced heat resistance is shown. The insulation blanket batting 6 may include a blanket body 9 having a network or weave of titanium dioxide fibers 3. In some embodiments, other fiber types 3a may be mixed or weaved into the blanket body 9. The other fiber types 3a may be carbon fibers and/or fiberglass fibers, for example and without limitation. Accordingly, the titanium dioxide fibers 3 may impart improved heat resistance without adding significant weight to the insulation blanket batting 6 when the insulation blanket batting 6 is used as an insulation blanket in aerospace or other applications.

Figure 3:
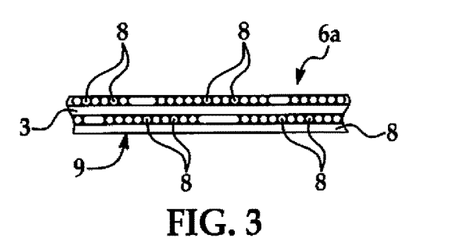
FIG. 3 is a cross-sectional view of an illustrative embodiment of an insulation blanket batting having titanium dioxide fibers and fiberglass fibers.

Referring next to FIG. 3, an alternative illustrative embodiment of the insulation blanket batting 6a has a blanket body 9 which may include a network or weave of fiberglass fibers 8. At least one distinct layer of titanium dioxide fibers 3 may form a fire-resistant barrier within the fiberglass fibers 8 in the blanket body 9. The insulation blanket batting 6 or the insulation blanket batting 6a may be processed to promote a suitable amount of lofting.

Figure 4:
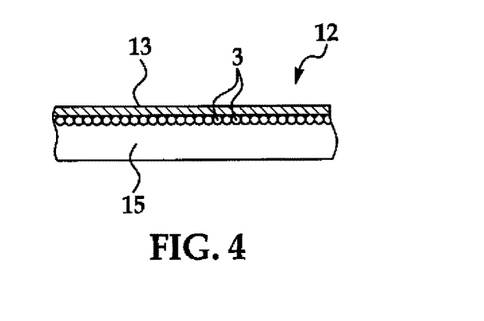
FIG. 4 is a cross-sectional view of an illustrative embodiment of an insulation blanket cover film having titanium dioxide fibers.

Referring next to FIG. 4, an illustrative embodiment of an insulation blanket cover film 12 with enhanced heat resistance is shown. The insulation blanket cover film 12 may be provided on insulation blanket batting 15. The insulation blanket batting 15 may include the insulation blanket batting 6 having titanium dioxide fibers 3, as was heretofore described with respect to FIG. 2. Alternatively, the insulation blanket batting 15 may include the insulation blanket batting 6a with fiberglass fibers 8 and a distinct layer of titanium dioxide fibers 3, as was heretofore described with respect to FIG. 3. Still further in the alternative, the insulation blanket 15 may be a conventional insulation blanket batting having fiberglass fibers only.

As shown in FIG. 4, the insulation blanket cover film 12 may include a cover film outer layer 13. The cover film outer layer 13 may be a metal such as aluminum, for example and without limitation. At least one layer of multiple titanium dioxide fibers 3 may be bonded to the cover film outer layer 13. Accordingly, the insulation blanket cover film 12 may enhance the heat resistance of the insulation blanket 15 in aerospace or other applications.

Figure 5:
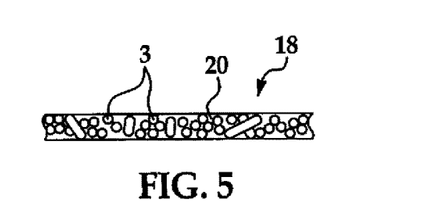
FIG. 5 is a cross-sectional view of an illustrative embodiment of a paper mat having titanium dioxide fibers.

Referring next to FIG. 5, an illustrative embodiment of a paper mat 18 with enhanced heat resistance is shown. The paper mat 18 may include a binder 20 and titanium dioxide fibers 3 provided in the binder 20. The paper mat 18 may be fabricated using conventional paper-forming techniques known to those skilled in the art.

Figure 5A:
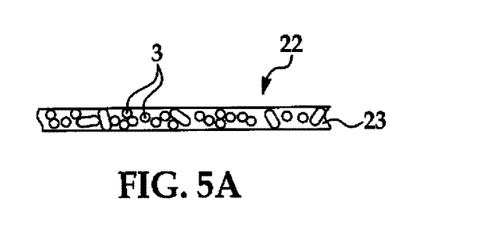
FIG. 5A is a cross-sectional view of an illustrative embodiment of a composite structure fabricated using the paper mat shown in FIG. 5.

Referring next to FIGS. 5 and 5A, in some applications, the paper mat 18 with heat resistance which was heretofore described with respect to FIG. 5 may be used in the fabrication of a thin composite structure 22 which is shown in FIG. 5A. The composite structure 22 may be suitable for light-blocking purposes, for example and without limitation. Accordingly, the titanium dioxide fibers 3 in the paper mat 18 (FIG. 5) which is used to fabricate the composite structure 22 may be dyed titanium dioxide fibers, for example and without limitation. The paper mat 18 of FIG. 5 may be impregnated with a resin 23 (FIG. 5A). Resins which are suitable for the resin 23 may include phenolics; benzoxazine and bis-phenol cyanate esters, for example and without limitation. The paper mat 18 and resin 23 may then be thermoformed into the composite structure 22 shown in FIG. 5A. Thermoforming may be accomplished by, for example and without limitation, heating the resin 23 while forming or shaping the paper mat and resin 23 using a suitable tool or dye (not illustrated) in a conventional manner. The composite structure 22 may then be used as a light block beneath a window reveal in a sidewall panel of an aircraft fuselage (not shown), for example and without limitation.

Figure 6:
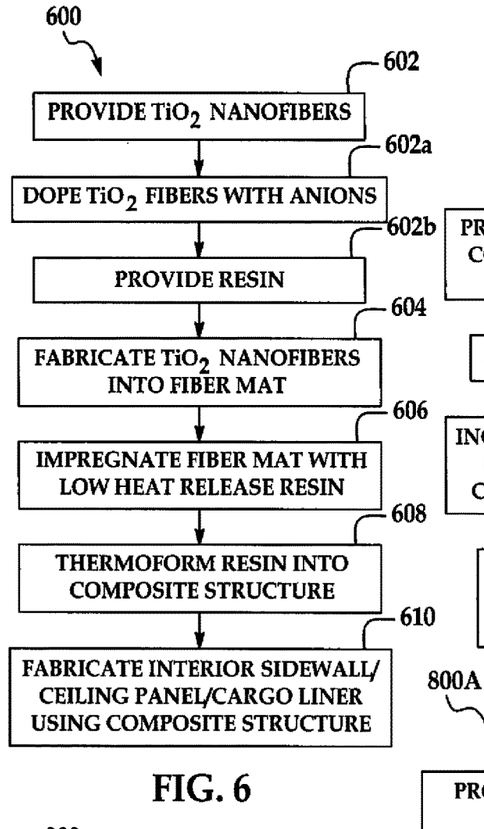
FIG. 6 is a flow diagram which illustrates an illustrative method of fabricating an aircraft structure with enhanced heat resistance using a composite structure having titanium dioxide fibers.

Referring next to FIGS. 1, 5 and 6, a flow diagram 600 which illustrates an illustrative method of fabricating an aircraft structure, for example and without limitation, with enhanced heat resistance using a composite structure 1 (FIG. 1) having titanium dioxide fibers is shown. In block 602 of the flow diagram 600, titanium dioxide nanofibers 3 are provided. The titanium dioxide nanofibers 3 may have an average diameter of about 10 nanometers. In block 602a, the titanium dioxide fibers may be doped with anions to enhance the electrical conductivity of the anions. In block 602b, a resin 2 is provided. In block 604, the titanium dioxide nanofibers 3 may be fabricated into a paper mat 18 (FIG. 5) or paper form. In block 606, the paper mat 18 or form may be impregnated with the resin 2. Resins which are suitable for the purpose may include phenolics, benzoxazine and bis-phenol cyanate esters, for example and without limitation. In block 608, the resin 2 may be thermoformed into a composite structure 1. In block 610, an interior sidewall; a ceiling panel; and/or a cargo liner of an aircraft fuselage, for example and without limitation, may be fabricated using the composite structure 1.

Figure 7:
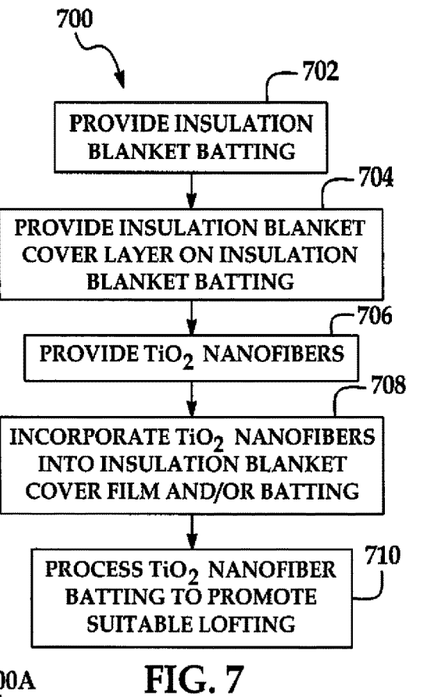
FIG. 7 is a flow diagram which illustrates an illustrative method of fabricating an insulation blanket batting with enhanced heat resistance.

Referring next to FIGS. 2, 4 and 7, an illustrative method of fabricating an insulation blanket batting 6 (FIG. 2) and/or insulation blanket cover film 12 (FIG. 4) with enhanced heat resistance is shown. In block 702, insulation blanket batting 6 is provided. In block 704, an insulation blanket cover layer 12 is provided on the insulation blanket batting 6. In block 706, titanium nanofibers 3 are provided. In block 708, the titanium nanofibers 3 are incorporated into an insulation blanket cover film 12 and/or an insulation blanket batting 6. In block 710, the insulation blanket batting 6 may be processed to promote suitable lofting.

Figure 8:
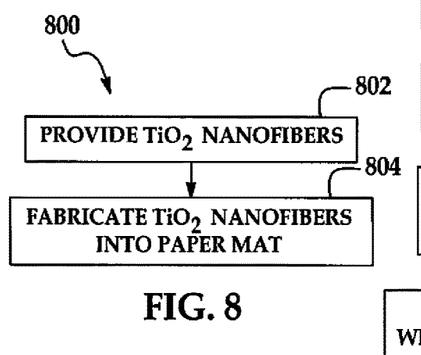
FIG. 8 is a flow diagram which illustrates an illustrative method of fabricating a paper mat having enhanced heat resistance.

Referring next to FIGS. 5 and 8, a flow diagram 800 which illustrates an illustrative method of fabricating a paper mat 18 (FIG. 5) having enhanced heat resistance is shown. In block 802 of the flow diagram 800, titanium dioxide nanofibers 3 are provided. In block 804, the titanium dioxide nanofibers 3 are fabricated into a paper mat 18.

Figure 8A:
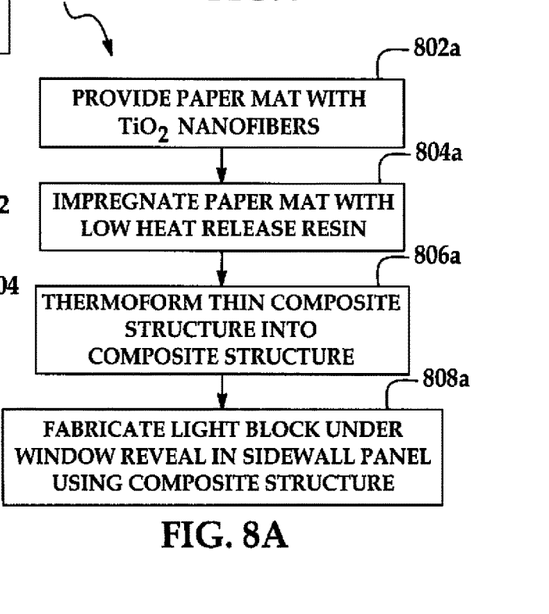
FIG. 8A is a flow diagram which illustrates an illustrative method of fabricating a light block under a window panel reveal in a sidewall panel using a composite structure having enhanced heat resistance.

Referring next to FIGS. 1, 5 and 8A, a flow diagram 800A (FIG. 8A) which illustrates an illustrative method of fabricating a thin composite structure 22 (FIG. 5A) which may be used to fabricate a light block under a window panel reveal in a sidewall panel, for example and without limitation, is shown. In block 802a, a paper mat (FIG. 5) with titanium dioxide nanofibers 3 is provided. In block 804a, the paper mat 18 with titanium dioxide nanofibers 3 is impregnated with a resin 23 (FIG. 5A). Resins which are suitable for the purpose may include phenolics, benzoxazine and bis-phenol cyanate esters, for example and without limitation. In block 806a, the thin composite structure 22 may be thermoformed into a composite structure 1 (FIG. 1). In block 808a, a light block under a window reveal in a sidewall panel of an aircraft fuselage may be fabricated using the composite structure 1.

Figure 9:
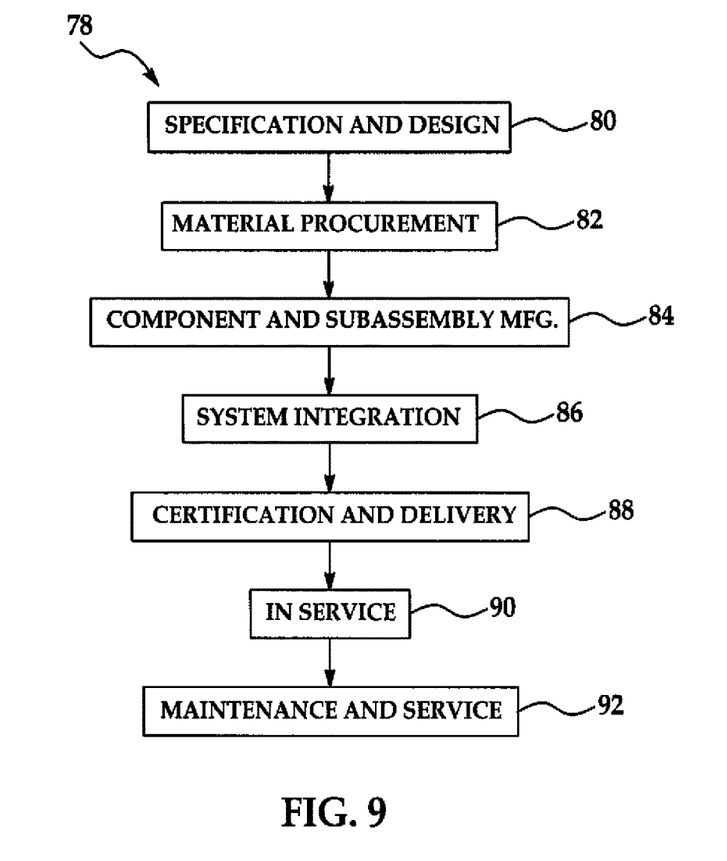
FIG. 9 is a flow diagram of an aircraft production and service methodology.
Figure 10:
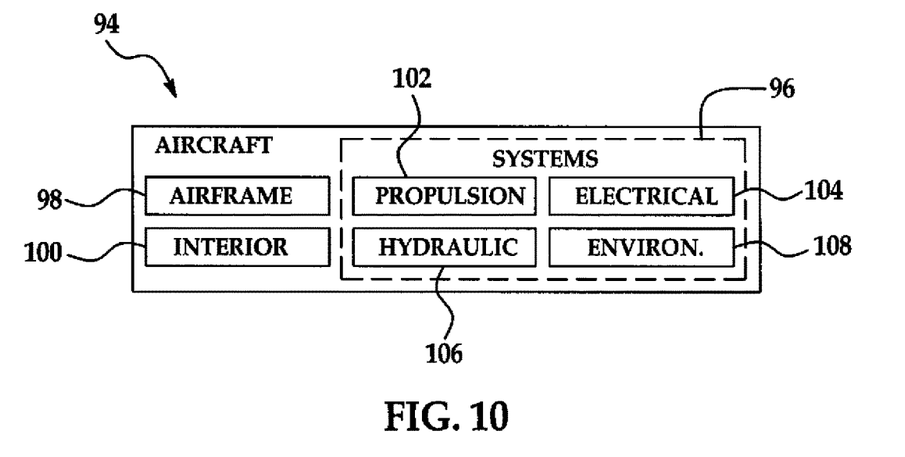
FIG. 10 is a block diagram of an aircraft.

Referring next to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and structure procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

A method of fabricating a structure with enhanced heat resistance, is presented. The method comprises providing a plurality of titanium dioxide fibers; providing a resin; impregnating said titanium dioxide fibers with said resin; and forming a composite structure by thermoforming said resin. In one illustrative example, the method may further comprise fabricating an aircraft structure using said composite structure. In one illustrative example, fabricating said structure using said composite structure comprises fabricating at least one of an interior sidewall, a ceiling panel and a cargo panel using said composite structure.

A method of fabricating an insulation blanket with enhanced heat resistance is presented. The method comprises providing insulation blanket batting; providing an insulation blanket cover layer on said insulation blanket batting; providing a plurality of titanium dioxide fibers; and incorporating said plurality of titanium dioxide fibers in at least one of said insulation blanket batting and said insulation blanket cover layer.

A method of fabricating a paper mat having enhanced heat resistance is presented. The method comprises providing a plurality of titanium dioxide fibers; and fabricating said plurality of titanium dioxide fibers into a paper mat. In one illustrative example, the method further comprises providing a resin; pre-impregnating said paper mat with said resin; forming a composite structure by thermoforming said resin; and fabricating a structure using said composite structure. In one illustrative example, the method further comprises providing a resin; pre-impregnating said paper mat with said resin; forming a composite structure by thermoforming said resin; and fabricating a structure using said composite structure wherein said fabricating a structure using said composite structure comprises fabricating a light block under window reveal in an aircraft sidewall panel.

A method of fabricating a structure with enhanced heat resistance is presented. The method comprises providing a plurality of titanium dioxide fibers having an average diameter of about 10 nanometers; enhancing electrical conductivity of said plurality of titanium dioxide fibers by doping said plurality of titanium dioxide fibers with anions; providing a resin selected from the group consisting of phenolic, benzoxazine and bis-phenol cyanate ester and having a thickness of about 0.080 inch; impregnating said titanium dioxide fibers with said resin; forming a composite structure by thermoforming said resin; and fabricating said aircraft structure using said composite structure.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite structure, comprising:
   a thermoformed, resin-impregnated paper mat;
   wherein the resin-impregnated paper mat is fabricated from a plurality of titanium dioxide nanofibers and a binder which are impregnated with a resin to form the resin-impregnated paper mat: and
   wherein the titanium dioxide nanofibers have an average diameter of about 10 nanometers and the resin-impregnated paper mat has a thickness no greater than 0.080 inches; and
   wherein the composite structure is formed by heating the resin-impregnated paper mat.

2. The composite structure of claim 1 wherein the resin is selected from the group consisting of phenolic, benzoxazine and bis-phenol cyanate ester.

3. The composite structure of claim 1, wherein said titanium dioxide fibers are randomly incorporated into said paper mat.

4. The composite structure of claim 1, wherein said titanium dioxide fibers are non-randomly incorporated into said paper mat.

5. The composite structure of claim 1 wherein said plurality of titanium dioxide fibers comprises a plurality of dyed titanium dioxide fibers.

6. The composite structure of claim 1 wherein said plurality of titanium dioxide fibers comprises a plurality of titanium dioxide fibers doped with anions to provide enhanced electrical conductivity.

7. An insulation blanket, comprising:
   a batting layer comprising only a plurality of titanium dioxide nanofibers having an average diameter of 10 nanometers; and
   a plurality of other fibers provided in a blanket body;
   wherein the plurality of titanium dioxide nanofibers have been doped with anions to form a plurality of doped titanium dioxide nanofibers;
   wherein a paper mat is formed comprising the plurality of doped titanium dioxide nanofibers and a binder, the paper mat having a thickness no greater than 0.080 inches, the plurality of doped titanium dioxide nanofibers randomly oriented in the paper mat;
   wherein the paper mat is impregnated with a resin selected from the group consisting of phenolic, benzoxazine and bis-phenol cyanate ester to form a resin-impregnated paper mat;
   wherein the insulation blanket is formed by thermoforming the impregnated paper mat.

8. The insulation blanket of claim 7, wherein the plurality of other fibers comprises a second plurality of titanium dioxide nanofibers provided in said blanket body.

9. The insulation blanket of claim 7, wherein the plurality of other fibers comprises at least one of carbon fibers and fiberglass fibers provided in said blanket body.

10. The insulation blanket of claim 9 wherein said plurality of titanium dioxide fibers comprises at least one distinct layer of said plurality of titanium dioxide fibers in said blanket body.

11. The insulation blanket of claim 7 wherein said plurality of titanium dioxide fibers comprises a plurality of dyed titanium dioxide fibers.

12. An insulation blanket comprising:
    a cover film outer layer; and
    at least one layer of titanium dioxide nanofibers having an average diameter of 10 nanometers bonded on said cover film outer layer;
    wherein the plurality of titanium dioxide nanofibers have been doped with anions to form a plurality of doped titanium dioxide nanofibers and formed into a paper mat using a binder, the paper mat having a thickness no greater than 0.080 inches, the plurality of doped titanium dioxide nanofibers randomly oriented in the paper mat;
    wherein the paper mat is impregnated with a resin selected from the group consisting of phenolic, benzoxazine and bis-phenol cyanate ester to form a resin-impregnated paper mat; and
    wherein the insulation blanket is thermoformed from the impregnated paper mat.

13. The insulation blanket cover film of claim 12 wherein said cover film outer layer comprises metal.

14. The insulation blanket cover film of claim 13 wherein said metal comprises aluminum.

15. A composite structure, comprising:
    a resin selected from the group consisting of phenolic, benzoxazine and bis-phenol cyanate ester;
    a plurality of titanium dioxide fibers having an average diameter of about 10 nanometers provided in said resin provided in said resin;
    said plurality of titanium dioxide fibers are doped with anions to enhance electrical conductivity of said plurality of titanium dioxide fibers;
    wherein the plurality of titanium dioxide nanofibers have been doped with the anions to form a plurality of doped titanium dioxide nanofibers and formed into a paper mat using a binder, the paper mat having a thickness no greater than 0.080 inches, the plurality of doped titanium dioxide nanofibers randomly oriented in the paper mat;

wherein the paper mat is impregnated with the resin to form a resin-impregnated paper mat and the composite structure is thermoformed from the resin-impregnated paper mat.

16. The composite structure of claim 1, wherein the composite structure forms a light block under a window reveal in an aircraft sidewall panel, the window reveal having a thickness corresponding to said paper mat.

17. The insulation blanket of claim 7, wherein the plurality of titanium dioxide nanofibers are in the form of a paper mat.

18. The insulation blanket of claim 12, wherein the plurality of titanium dioxide nanofibers are in the form of a paper mat.

\* \* \* \* \*

UNITED STATES PATENT AND TRADEMARK OFFICE
CERTIFICATE OF CORRECTION

| | |
|---|---|
| PATENT NO. | : 9,683,362 B2 |
| APPLICATION NO. | : 13/913641 |
| DATED | : June 20, 2017 |
| INVENTOR(S) | : John N. Harris et al. |

Page 1 of 1

It is certified that error appears in the above-identified patent and that said Letters Patent is hereby corrected as shown below:

In the Specification

Column 7, Line 47, change ":" to --;--.
Column 7, Line 54, after "wherein" insert --,--.
Column 7, Line 63, after "wherein" insert --,--.
Column 7, Line 66, after "wherein" insert --,--.
Column 8, Line 28, after "9" insert --,--.
Column 8, Line 32, after "7" insert --,--.
Column 8, Line 53, after "12" insert --,--.
Column 8, Line 55, after "13" insert --,--.
Column 8, Line 62, delete "provided in said resin".

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*